(12) United States Patent
He et al.

(10) Patent No.: US 12,032,868 B2
(45) Date of Patent: *Jul. 9, 2024

(54) MULTIPLE VIDEO STREAM GENERATION BASED ON DIFFERENT PIXEL SETS WITHIN AN INITIAL VIDEO STREAM

(71) Applicant: Zoom Video Communications, Inc., San Jose, CA (US)

(72) Inventors: Zhichu He, Hangzhou (CN); Yi Guo, Hangzhou (CN); Bo Ling, Saratoga, CA (US); Jing Wu, Hangzhou (CN); Yichen Zhang, Hangzhou (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,116

(22) Filed: Jun. 16, 2023

(65) Prior Publication Data

US 2024/0020083 A1 Jan. 18, 2024

Related U.S. Application Data

(63) Continuation of application No. 17/877,915, filed on Jul. 30, 2022, now Pat. No. 11,720,315.

(30) Foreign Application Priority Data

Jul. 12, 2022 (CN) .......................... 202221790490.6

(51) Int. Cl.
*G06F 3/041* (2006.01)
*G06F 3/14* (2006.01)
*H04N 7/15* (2006.01)

(52) U.S. Cl.
CPC ............. *G06F 3/1454* (2013.01); *H04N 7/15* (2013.01)

(58) Field of Classification Search
CPC ....... H04N 21/234327; H04N 21/2662; H04N 21/4314; H04N 21/4622; H04N 21/4858;
(Continued)

(56) References Cited

U.S. PATENT DOCUMENTS

| 11,265,181 B1 | 3/2022 | Springer |
| 11,330,026 B1 | 5/2022 | Han et al. |

(Continued)

OTHER PUBLICATIONS

International Search Report and Written Opinion mailed on Sep. 14, 2023 in corresponding PCT Application No. PCT/US2023/027211.

(Continued)

*Primary Examiner* — Insa Sadio
(74) *Attorney, Agent, or Firm* — Young Basile Hanlon & MacFarlane, P.C.

(57) ABSTRACT

Methods, systems, and apparatus, including computer programs encoded on computer storage media related to multi-stream video encoding for screen sharing a communications session. The system may determine an active pixel area and a remaining pixel area of a video region. of a video region. A first video stream of the active pixel area is generated at a first frame rate. A second video stream of the remaining pixel area is generated at second frame rate, where the second frame rate is a frame rate lower than the first frame rate. A client device may transmit the first video stream and the second video stream to a second client device.

20 Claims, 10 Drawing Sheets

(58) Field of Classification Search
CPC ... H04N 21/654; H04N 21/6587; H04N 7/152
See application file for complete search history.

(56) References Cited

U.S. PATENT DOCUMENTS

| | | | |
|---|---|---|---|
| 2008/0303949 A1 | 12/2008 | Ciudad et al. | |
| 2011/0150433 A1 | 6/2011 | Alexandrov et al. | |
| 2015/0334313 A1* | 11/2015 | Chougle | H04L 65/1083 348/14.07 |
| 2019/0295455 A1* | 9/2019 | Goodson | H04N 21/6377 |
| 2020/0118516 A1* | 4/2020 | Kim | G09G 5/006 |
| 2020/0236323 A1 | 7/2020 | Ernst et al. | |

OTHER PUBLICATIONS

Yang Siyu et al: "A Hardware-Accelerated System for High Resolution Real-Time Screen Sharing", IEEE Transactions on Circuits and Systems for Video Technology, IEEE, USA, vol. 29, No. 3, Mar. 1, 2019 (Mar. 1, 2019), pp. 881-891, XP011714238, ISSN: 1051-8215, DOI: 10.1109/TCSVT.2018.2809690 [retrieved on Mar. 7, 2019] abstract p. 881, col. 2—p. 883, col. 1, p. 884, col. 1-col. 2 figure 2.

\* cited by examiner

MULTIPLE VIDEO STREAM GENERATION BASED ON DIFFERENT PIXEL SETS WITHIN AN INITIAL VIDEO STREAM

CROSS-REFERENCE TO RELATED APPLICATION(S)

This application is a continuation of U.S. application Ser. No. 17/877,915, filed Jul. 30, 2022, which claims priority to Chinese Patent Application No. 202221790490.6, filed Jul. 12, 2022, the entire disclosures of which are herein incorporated by reference.

FIELD

This application relates generally to video stream encoding, and more particularly, to systems and methods for multi-stream video encoding for screen sharing within a communications session.

SUMMARY

The appended claims may serve as a summary of this application.

DETAILED DESCRIPTION OF THE DRAWINGS

Figure 1A:
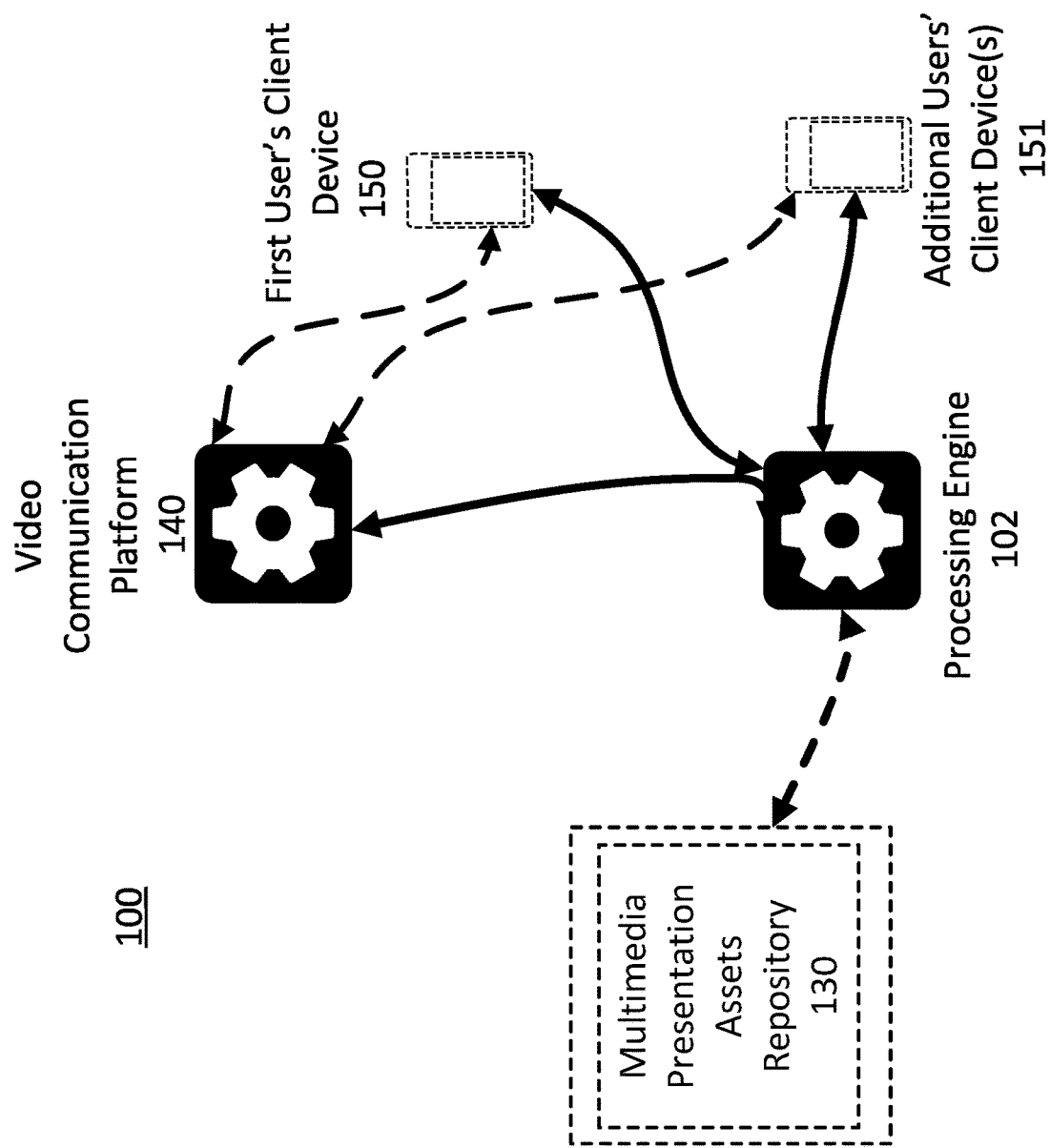
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a first user's client device 150 and one or more additional users' client device(s) 151 are connected to a processing engine 102 and, optionally, a video communication platform 140. The processing engine 102 is connected to the video communication platform 140, and optionally connected to one or more repositories (e.g., non-transitory data storage) and/or databases, including a Multimedia Presentation Assets Repository 130 for storing multi-media presentations. The first user's client device 150 and additional users' client device(s) 151 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 300, 400, 500, 600 or other methods herein and, as a result, provide for multi-stream video encoding for screen sharing a communications session. In some embodiments, this may be accomplished via communication with the first user's client device 150, additional users' client device(s) 151, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 151 may perform the methods 300, 400, 500, 600 or other methods herein and, as a result, provide for video stream downscaling and upscaling in a video communications platform. In some embodiments, this may be accomplished via communication with the first user's client device 150, additional users' client device(s) 151, processing engine 102, video communication platform 140, and/or other device(s) over a network between the device(s) and an application server or some other network server.

The first user's client device 150 and additional users' client device(s) 151 may be devices with a display configured to present information to a user of the device. In some embodiments, the first user's client device 150 and additional users' client device(s) 151 present information in the form of a user interface (UI) with UI elements or components. In some embodiments, the first user's client device 150 and additional users' client device(s) 151 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, video conference, webinar, or any other suitable video presentation) on a video communication platform. The additional users' client device(s) 151 may be configured to viewing the video presentation, and in some cases, presenting material and/or video as well. In some embodiments, first user's client device 150 and/or additional users' client device(s) 151 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 151 are computing devices capable of hosting and executing one or more applications or other programs capable of sending and/or receiving information. In some embodiments, the first user's client device 150 and/or additional users' client device(s) 151 may be a computer desktop or laptop, mobile phone, video phone, conferencing system, or any other suitable computing device capable of sending and receiving information. In some embodiments, the processing engine 102 and/or video communication platform 140 may be hosted in whole or in part as an application or web service executed on the first user's client device 150 and/or additional users' client device(s) 151. In some embodiments, one or more of the video communication platform 240, processing engine 102, and first user's client device 150 or additional users' client devices 151 may be the same device. In some embodiments, the first user's client device 150 is associated with a first user account on the video communication platform, and the additional users' client device(s) 151 are associated with additional user account(s) on the video communication platform.

Video communication platform 140 comprises a platform configured to facilitate video presentations and/or communication between two or more parties, such as within a video conference or virtual classroom. In some embodiments, video communication platform 140 enables video conference sessions between one or more users.

Figure 1B:
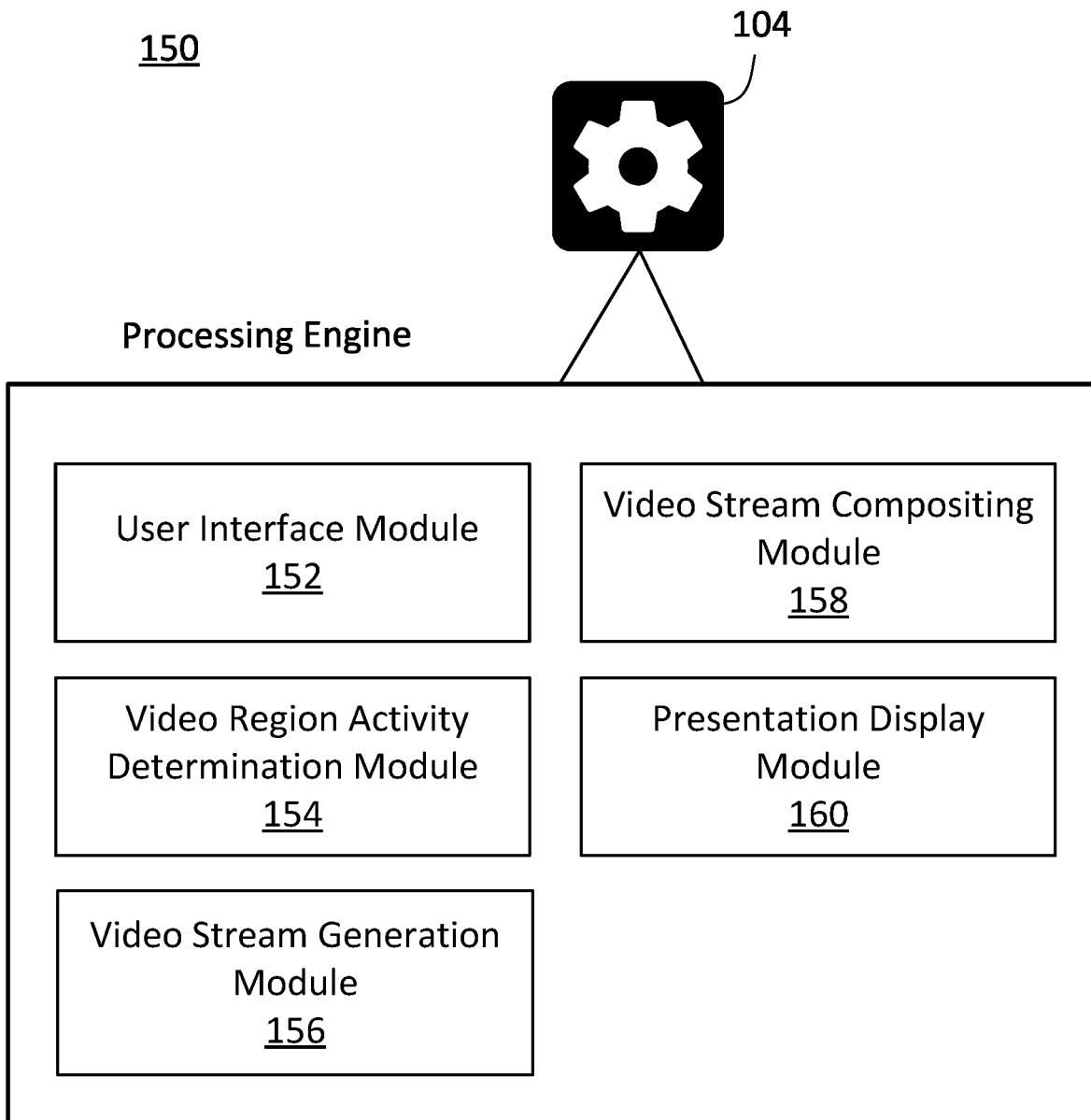
FIG. 1B is a diagram illustrating an exemplary computer system with software and/or hardware modules that may execute some of the functionality described herein.

FIG. 1B is a diagram illustrating an exemplary computer system 150 with software and/or hardware modules that may execute some of the functionality described herein. Computer system 150 may comprise, for example, a server or client device or a combination of server and client devices for multi-stream video encoding for screen sharing a communications session.

The User Interface Module 152 provides system functionality for presenting a user interface to one or more users of the video communication platform 140 and receiving and processing user input from the users. User inputs received by the user interface herein may include clicks, keyboard inputs, touch inputs, taps, swipes, gestures, voice commands, activation of interface controls, and other user inputs. In some embodiments, the User Interface Module 152 presents a visual user interface on a display screen. In some embodiments, the user interface may comprise audio user interfaces such as sound-based interfaces and voice commands.

The Video Region Activity Determination Module 154 provides system functionality for the detection and determination of one or more active pixel areas of a video region. The Video Region Activity Determination Module 154 also determines remaining areas of the video region that do not include active pixel areas.

The Video Stream Generation Module 156 provides system functionality for the generation of video streams for the determined one or more active pixels areas of the video region and of the remaining area of the video region. The Video Stream Generation Module 156 provides for the transmission of separate video streams (e.g., separate streamed video channels). The Video Stream Generation Module may transmit the separate video streams at different bit rates. Also, the separate video streams may be video at different frame rates, where one video stream has a video frame rate that is higher than another video stream.

The Video Stream Compositing Module 158 provides system functionality compositing separate video streams received from another client device. The receiving client device may combine two or more received video streams and display the compositive video stream via a user interface of the receiving client device.

The Presentation Display Module 160 provides system functionality for displaying or presenting multi-media presentation and/or screen sharing content that has video and/or animated graphics.

Figure 2:
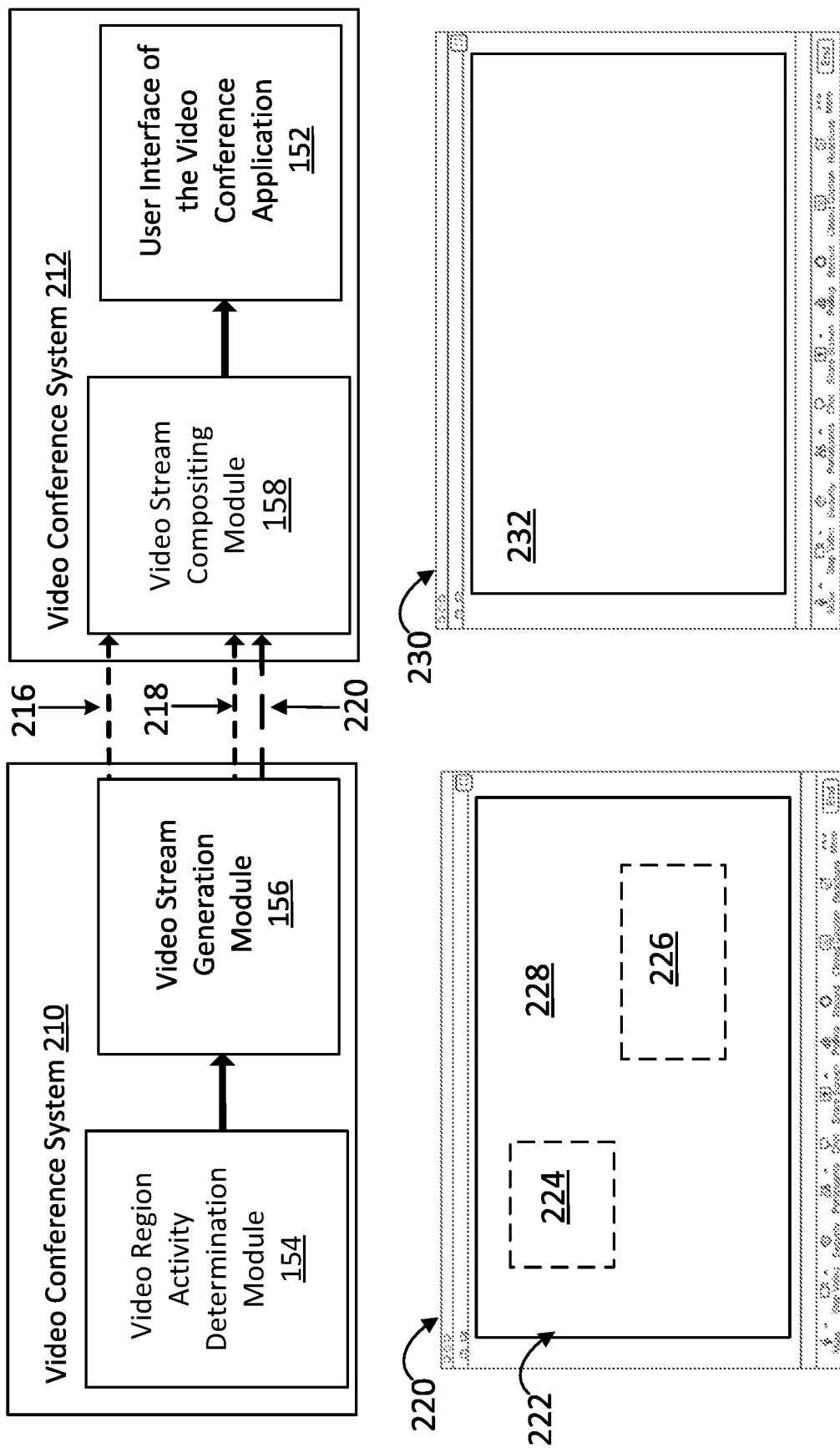
FIG. 2 is a diagram illustrating an exemplary environment in which some embodiments may operate.

FIG. 2 illustrates one or more client devices that may be used to participate in a video conference. In one embodiment, during a video conference, two video conference participants may communicate and transmit audio, video and other data to one another. A first video conference participant may use video conference system 210 and a second video conference participant may use video conference system 212. The first video conference participant may present a multi-media presentation including embedded video in the presentation. The second video conference participant would be able to view the presentation.

In some embodiments, a first client device operating the video conference system 210 would evaluate a video region and determine one or more active pixel areas of the video region 222. For example, the Video Region Activity Determination Module 154 may evaluate areas of the video region 222 of the user interface 220, and determine one or more active pixel areas 224, 226. Additionally, the Video Region Activity Determination Module 154 may determine a remaining pixel area 228 that does not include the one or more active pixel areas 224, 226. The video region may be a region of a screen, user interface, and/or an area of visual information that may be presented by the first client device to other client devices. Determination of the one or more active pixel areas of a video region are discussed below.

In some embodiments, the first client device operating the video conference system 210, may generate multiple video steams (e.g., video channels) and transmit the multiple video streams to client devices of other video conference participants. For example, the video conference system 210 may transmit video streams 216, 218, 220 to the client device of the second video conference participant. While only three video streams 216, 218, 220 are depicted for illustration purposes, multiple video streams may be generated and transmitted by the video conference system 210. In this example, video stream 216 may include a video stream of the determined active pixel area 224 of the video region 222. Video stream 218 may include a video stream of the determined active pixel area 226 of the video region 222. Video stream 220 may include a video stream of the remaining pixel area 228 of the video region 222.

In some embodiments, the video streams 216, 218, 220 include video at different frame rates. In one example, the video stream 216 of the active pixel area 224 may include video at a frame rate of 30 frames per second. The video stream 218 of the active pixel area 226 may include video at a frame rate of 60 frames per second. In another example, both video streams 216, 218 of the active pixel areas 224, 226 may include video at the same rate (such a 30 frames per second). The video stream 220 of the remaining pixel area 228 of the video region 222 would be at a frame rate that is lower than the frame rate of the video of the video streams 216, 218 including the active pixels areas 224, 226. For example, the frame rate of the video stream may be at a frame rate ranging from 3 to 20 frames per second.

In some embodiments, the second client device operating the video conference system 212 may receive multiple video streams. In some instances, the video conference system 212 may receive multiple video streams from multiple other video conference systems. For example, the video conference system 212 may receive multiple video streams 216, 218. A Video Stream Compositing Module 158 may combine the video streams to generate composited video stream to be displayed via a user interface 152, 230 of the second client device. The composited video stream may be presented via a display area 232 of the user interface 230.

In some embodiments, the Video Stream Compositing Module may evaluate the multiple video streams received from another client device and then generate video to be displayed on the client device receiving the video streams. The generated video may be displayed at frame rates corresponding to the video frame rates of the received video streams. For example, if the video stream 216 is at a frame rate of 60 frames per second, the video stream 218 is at a frame rate of 30 frames per second, and the video stream 220 is at a frame rate of 5 frames per second, then the Video Stream Compositing Module may generate for display a video an area of the video is at frames per second, an area of the video is at 30 frames per second, and a portion of the video is at 5 frames per second. In other words, the receiving client device may display the multiple received video streams as a composite video with having frame rates corresponding to the frame rates of the video streams as received.

In some embodiments, the Video Stream Compositing Module 158 may evaluate the multiple video streams received from another client device and then generate a video at a frame rate of the highest frame rate received. For example, if the video stream 216 is at a frame rate of frames per second, the video stream 218 is at a frame rate of 30 frames per second, and the video stream 220 is at a frame rate of 5 frames per second, then the Video Stream Compositing Module may generate for display a video combining frames of each of the video streams into frames of the video stream having the highest frame rate. In this example, the frames of the video stream 220 would be increase by 12 times and the frames of the video stream 218 would be increased two times.

Figure 3:
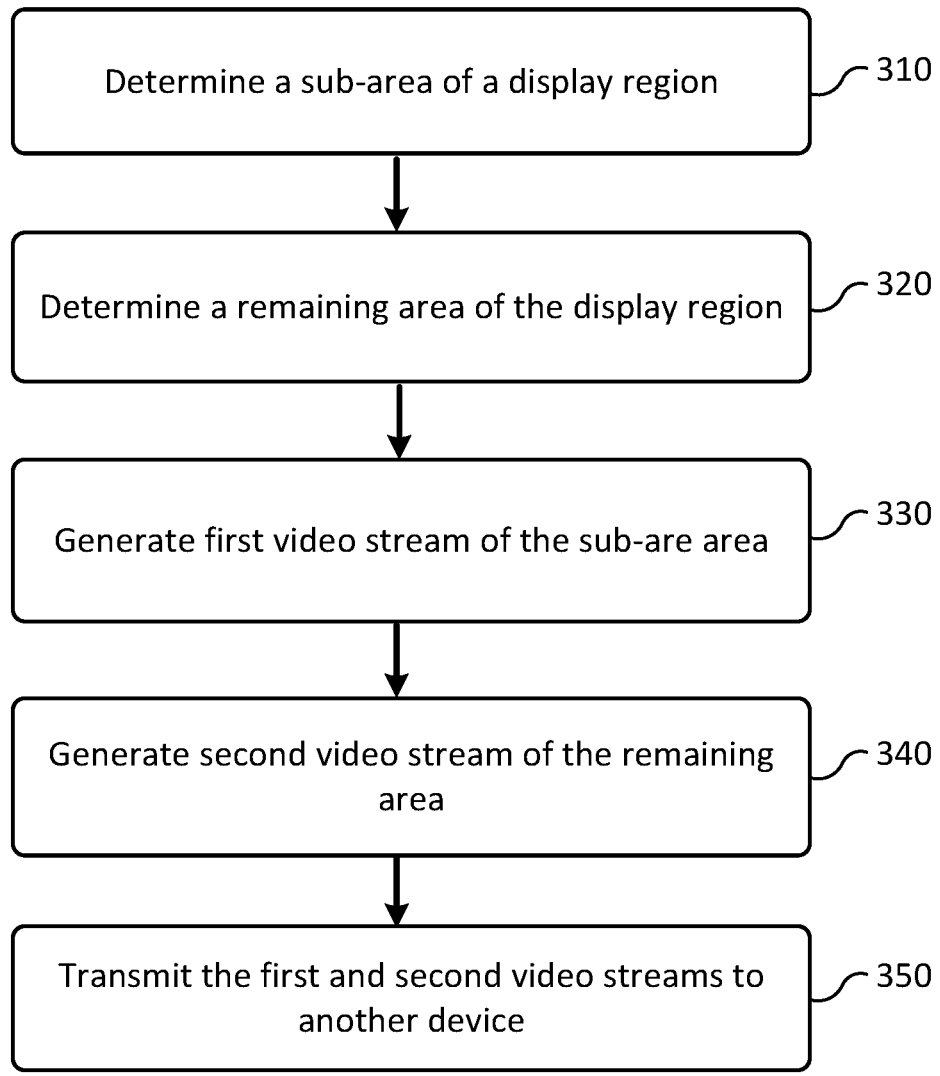
FIG. 3 is a flow chart illustrating an exemplary method that may be performed in some embodiments.

FIG. 3 is a flow chart illustrating an exemplary method 300 that may be performed in some embodiments. In step 310, the system 100 determines an active pixel area of a video region. In some embodiments, the active pixel area of the video region includes an area of changing pixel values among consecutive frames of the video region.

In step 320, the system 100 determines a remaining pixel area of the video region. In some embodiments, the remaining pixel area of the video region includes a portion of the video region that has a group of static pixel values among consecutive frames of the video region.

In step 330, the system 100 generates a first video stream of the active pixel area with the first video stream having a first frame rate.

In step 340, generates a second video stream of the remaining pixel area with the second video stream having a second frame rate that is a frame rate lower than the first frame rate.

At step 350, the system 100 transmits, by a first client device, the first video stream and the second video stream to a second client device.

The system 100 may periodically monitor the video region and resize the active pixel area. For example, the system 100 may determine whether pixels about a boundary of the active pixel area are changing among frames of the video region. Upon determining the pixels about the boundary of the active pixel area is changing, the system 100 may a size of the active pixel area to include those pixels that are determined to be changing.

Moreover, in some embodiments, the system 100 may determine multiple active pixels areas of the video region. For example, the system 100 may determine a second active pixel area of the video region. The second active pixel area may be another area of the video region that is distinct or different than the active pixel area that was determined in step 310. The system 100 may generate a generate a third video stream of the second active pixel area. the third video stream may a third frame rate. This third frame rate may be a frame rate higher than the second frame rate of the second video stream. The client device may transmit the third video stream to a second client device concurrently with the first video stream and the second video stream. In some embodiments, the first video stream is transmitted at a variable bitrate, and the second video stream is transmitted at a constant bitrate.

Figure 4:
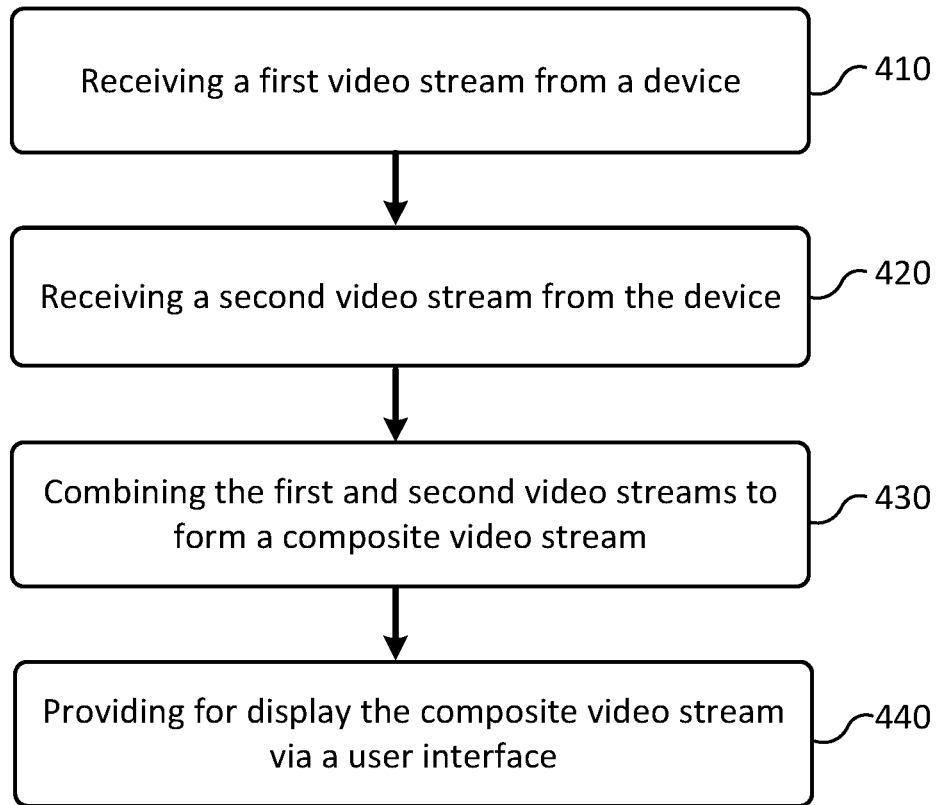
FIG. 4 is a flow chart illustrating an exemplary method that may be performed in some embodiments.

FIG. 4 is a flow chart illustrating an exemplary method 400 that may be performed in some embodiments. In some embodiments, multiple videos streams depicting a shared screen may be generated by a first client device and sent to other client devices. The receiving client devices may synchronize and merge the received video stream to generate a full video depicting the shared screen of the first client device.

At step 410, a client device receives a first video stream having a frame rate. For example, the received video stream may be the first video stream generated and transmitted by the client device with respect to step 350 of FIG. 3.

At step 420, the client device receives a second video stream having a frame rate lower than the first frame rate. For example, the received video stream may be the second video stream generated and transmitted by the client device with respect to step 350 of FIG. 3.

At step 430, the client device combines the first video stream and the second video stream to form a composite video stream. The client device then provides for display the composite video stream to a user interface of the client device. In some embodiments, the composite video stream may be displayed at the frame rate of the first video stream.

Figure 5:
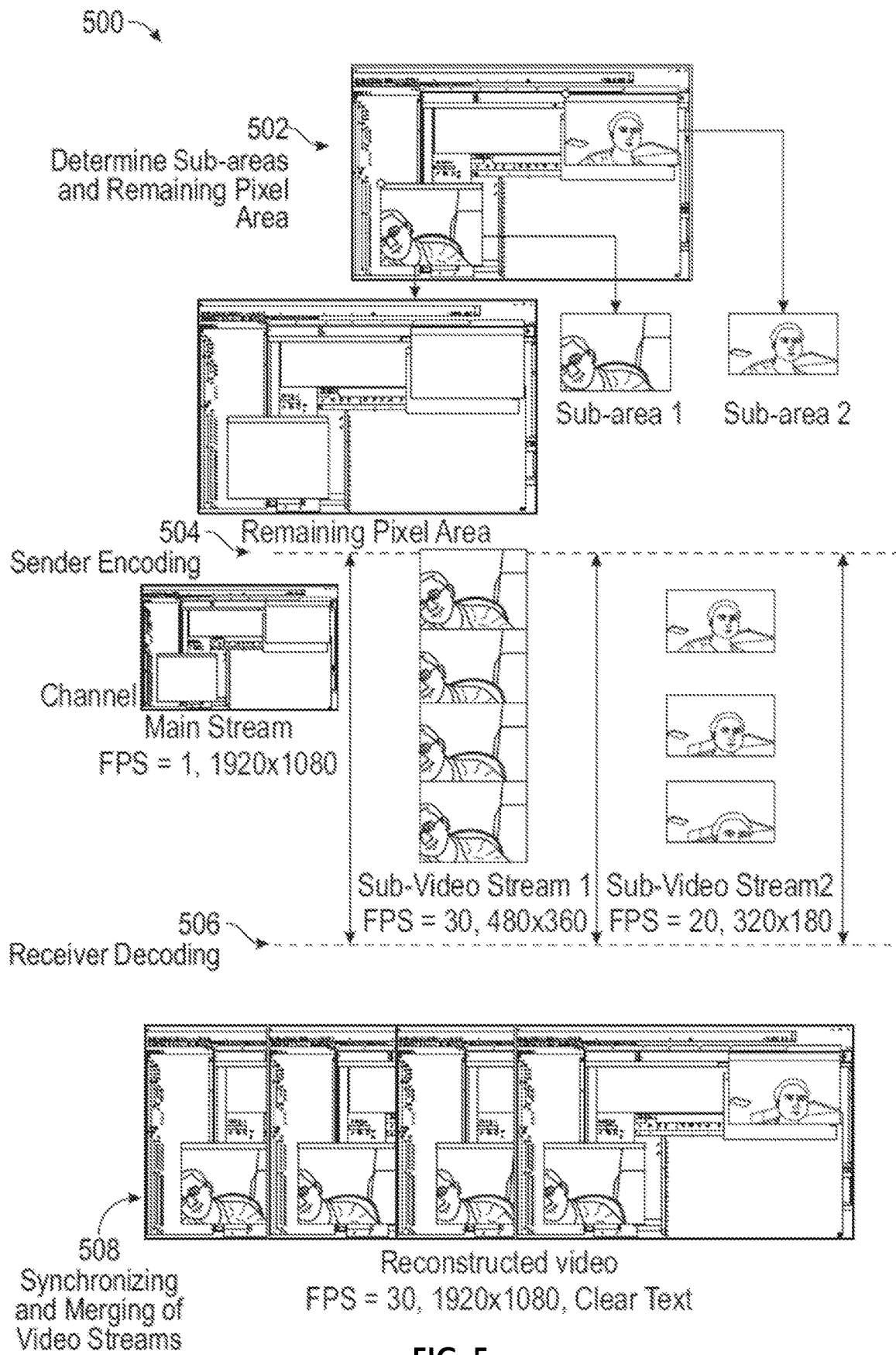
FIG. 5 is a flow chart illustrating an exemplary method that may be performed in some embodiments.

FIG. 5 is a flow chart illustrating an exemplary method 500 that may be performed in some embodiments. A multi-stream encoding method 500 is illustrated including the steps of determining active pixel areas and a remaining pixel area, sender encoding 504, receiver decoding 506 and synchronizing and merging of video streams 508. An example screen is being shared to other video conference participants. The shared screen includes two areas of video being displayed.

In step 502, a first client device determines one or more active pixel areas and a remaining pixel area. In some embodiments, active pixel areas (e.g., active pixel area 1 and active pixel area 2) are separated from a remaining pixel area of a video region (e.g., the full screen region with video region filling with black color noting that active pixel areas 1 and 2 are not included. The regions of the video (i.e., the active pixel area 1, active pixel area 2, and the remaining pixel area are encoded into bit-streams as sub-video streams. For example, the active pixel area 1 and active pixel area 2 may be encoded into video sub-streams using a fluency-first encoding method, and the remaining pixel area may be encoded into a main video stream using a clarity-first encoding method. Multiple sub-video streams may be generated for each of the determined active pixel areas. In other words, there may be more than one sub-video streams depending on how many active pixel areas are determined in a screen being shared.

In step 504, the first client device generates multiple video streams based on the determined one or more active pixel areas and the remaining pixel area of a video region. In some embodiments, a main video stream including the remaining pixel area, a sub-video stream of the active pixel area 1, and a sub-video stream of active pixel area 2 may be transmitted by a client device to a receiving device.

In step 506, the first client device transmits the generated multiple video streams (i.e., the main video stream of the remaining pixel area and the sub-video streams of the active pixel area 1 and the active pixel area 2) to one or more receiving client devices. In some embodiments, the first client device may transmit the multiple video streams to multiple receiving client devices. The receiving client devices perform an operation of video stream decoding on the received video streams.

In step 508, a receiving client device performs operations of synchronizing and merging of the multiple received video streams to generation a composite video to be displayed via a user interface of the receiving client device. As such, a full video is reconstructed depicting the screen being shared by the first client device.

Figure 6:
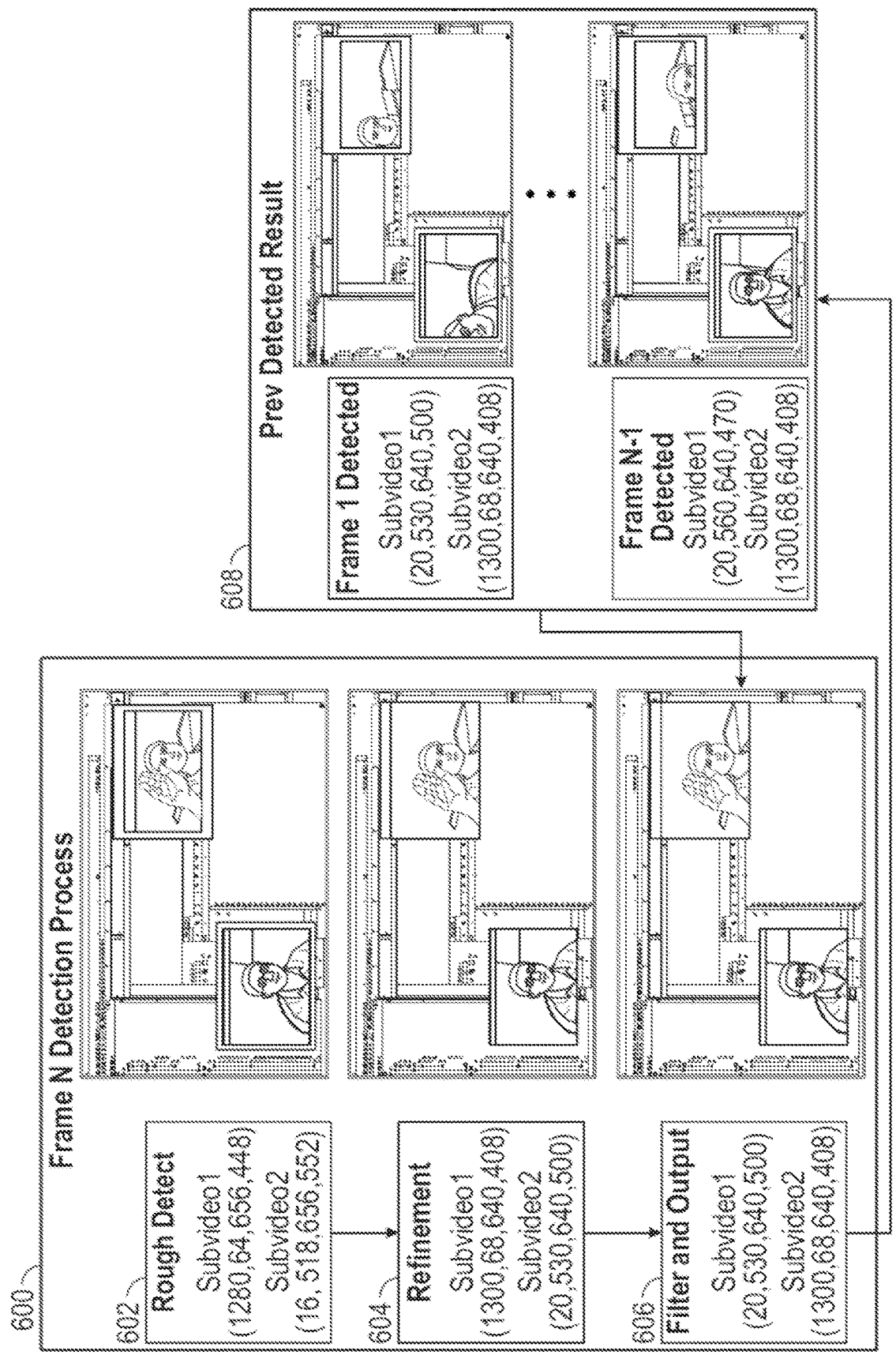
FIG. 6 is a flow chart illustrating an exemplary method that may be performed in some embodiments.

FIG. 6 is a flow chart illustrating an exemplary method 600 that may be performed in some embodiments. Determination of one or more active pixel areas and a remaining pixel area is illustrated by method 600. In some embodiments, the determination of pixel areas may include the steps of rough sub-video detection 602, refinement processing 604, filter and output processing 606, and detection of previous results 608.

In some embodiments, the method 600 detects temporally stable regions of each sub-video of a video region being displayed in the video region. This step determines a bounding box about a likely active pixel area. The bounding box may be described by four parameters: X, Y, Width and Height, where (X, Y) is the coordinate of the top-left pixel of video region. There are two types of regions that may be determined: detected regions and output regions. A detected region/result is a detected video region using current frame information of the video. An output region/result is a final result used to separate sub-videos. The output region may be a sequentially stable result and does not change frequently.

In step 602, a detected region may be identified or determined using a rough detection process to identify an area of likely active pixels indicating that video is present in the area. This detected region may include static pixels outside of the likely active pixels. In step 604, the detected region is further refined to reduce its original size to exclude the static pixels that are not part of the video. Step 604 would reduce the bounding box from its original determined size. In step 606, the detected results are refined to a pixel level. In step 608, after reordering and filtering using previous detected results, the final output result is achieved.

In some embodiments, a client device may perform the rough video detection step 602 to identify an area of likely active pixels of video in a video region. The rough video detection process 602 may include a sub-process of detecting a static block map, generating a search region, searching a MaxRow and MaxCol of the search region, extending rough search results and dividing rough search results into multiple sub regions, and iterating through the process again from the setting up a search region until all of the sub-videos of a video region are determined.

In some embodiments, the rough video detection process 602 may determine a static block map of the video region. This static block map may describe every block in a current frame of a video, whether the block is static or not. The static information may be calculated by comparing pixel sum of a current block with reference block. The reference block may be a co-located block from a previous frame of the video. The client device may then generate a search region. The search region includes a region of a frame of the video. If a first sub-video is being identified, then the search region may be set as the whole frame. Otherwise, the search region may be set to an area of frame as the remaining region. Next the client device may perform a search of a MaxRow and MaxCol of the search region. The MaxRow and MaxCol are the longest unbroken lines consist of non-static blocks in horizontal and vertical direction. The client device may extend the rough search results to cover neighboring moving objects. For example, sometimes a video includes moving subtitles which may not be part of or attached to an active video region. As such, the moving subtitle would usually not be included into the search result in the search of the MaxRow and MaxCol. Next the client device may a step to divide rough search result into multiple sub regions. For example, sometimes two small sub-videos are very close to each other. Without further sub-video detection, the two small sub-videos may be identified as a single video. Further processing may be performed on a sub-region to separate the small sub-videos. For example, static line detection may be used to separate the two small sub-videos. The sub-process may iterate through the process at the generating a search region step until all the sub-videos are detected.

In some embodiments, a client device may perform the refinement step 604 where a detected region is further refined to reduce its original size to exclude the static pixels that are not part of the video. After extension and separation, the detected results may be very close to the actual results. Since the results is block-level, its region size is usually larger than the actual result. Static line detection may be used to refine the boundary to pixel-level.

In some embodiments, a client device may perform a reordering and filtering step 606 using previous detected results, the final output result is achieved. First, the client device performs the step of reordering detected results. The first searched video region might vary. Sometimes, sub-video 0 may be the first detected region. Sometimes sub-video 1 may be the first detected region. To increase the result stability, detected results may be reordered by comparing with previous output results.

In some instances, the detected results of a same video region changes frequently among video frames. For example, when the video content becomes static in boundary of video region, the detected video region might be smaller than the actual one. Sometimes, there may be a non-intended jitter in a boundary of video content. In this instance, the detected result might be larger than the actual one. The frequent change of detect result is not suitable for video encoding, since frequent size changes will bring Intra frames with large bits and should be filtered. To filter out jitter in boundary of sub-video, a sliding window-based filtering method may be used. The sliding window provides a flexible buffer to store previous detected results. The size of sliding window depends on the frame rate of the video. First, an Unreliable Score value may be determined, which describes previous an output result is reliable or not. If there is no previous output result, the unreliable score is the number of detected frames. Otherwise, the unreliable score would be the number of successive frames whose detection result is different from previous output result. When the Unreliable Score value reaches a threshold value, a Similar Score may be determined by comparing current detect results with previous detected results in sliding window. If the Similar Score value reaches a threshold value and a current sub-video is not text-content, it would be determined as a reliable result and would be output.

Figure 7:
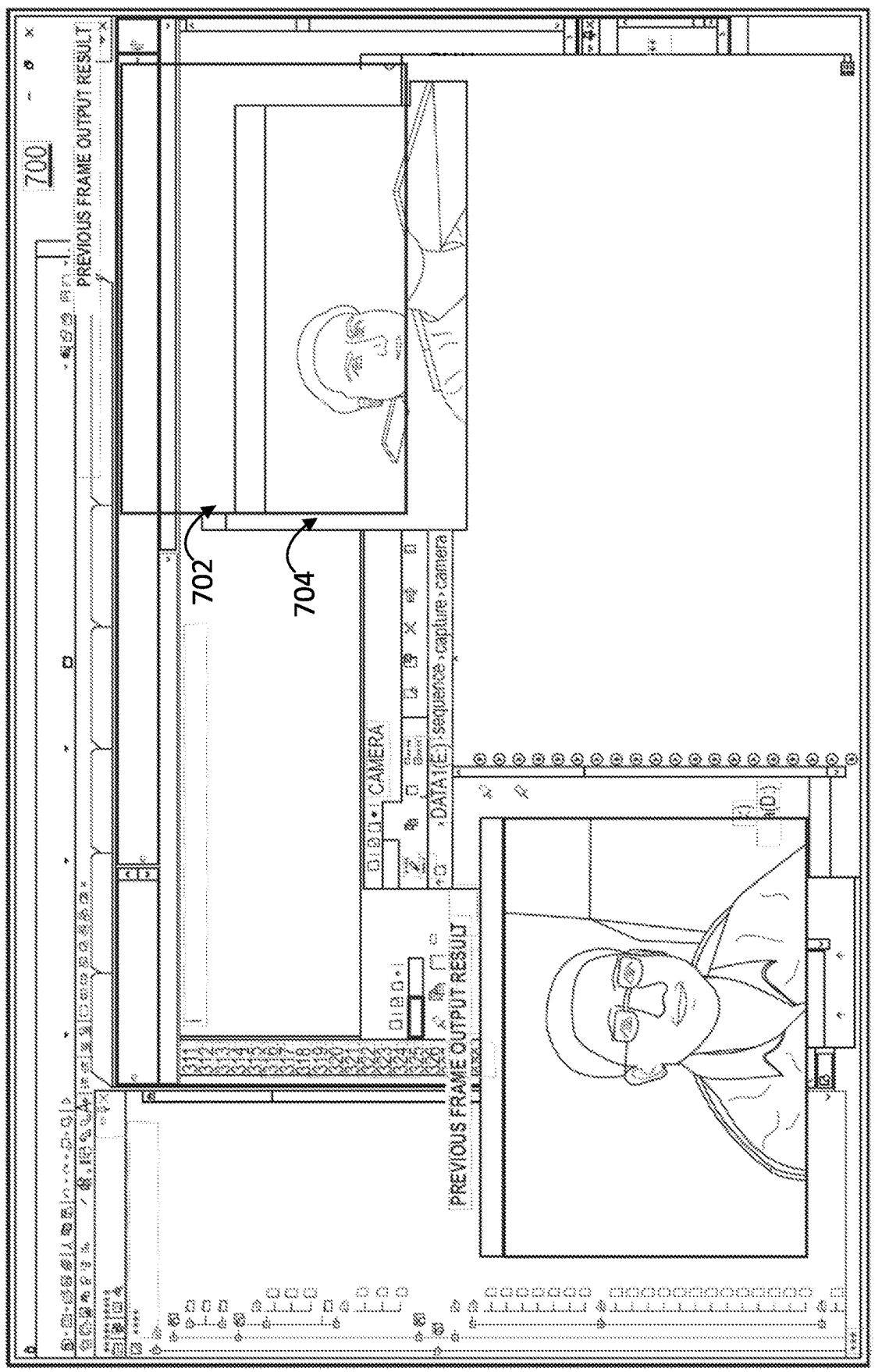
FIG. 7 is a diagram illustrating an exemplary user interface with a video dragging operation.

FIG. 7 is a diagram illustrating an exemplary user interface with 700 a video dragging operation causing image fragmentation. In some instances, while presenting a screen the user may drag a video from a first position to a second position. In these situations, the client device may perform a process for detection video dragging or movement of a video boundary from the first position to the second position. In this situation, the output as discussed previously should be changed quickly, otherwise image fragmentation might occur as depicted in FIG. 7.

Figure 8:
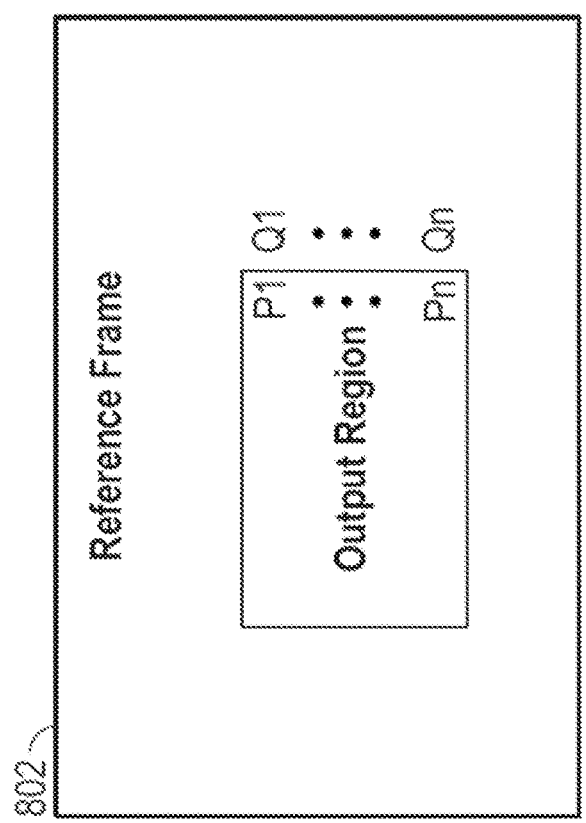
FIG. 8 is a diagram illustrating a current video frame and a reference for detecting video region movement.
Figure 8:
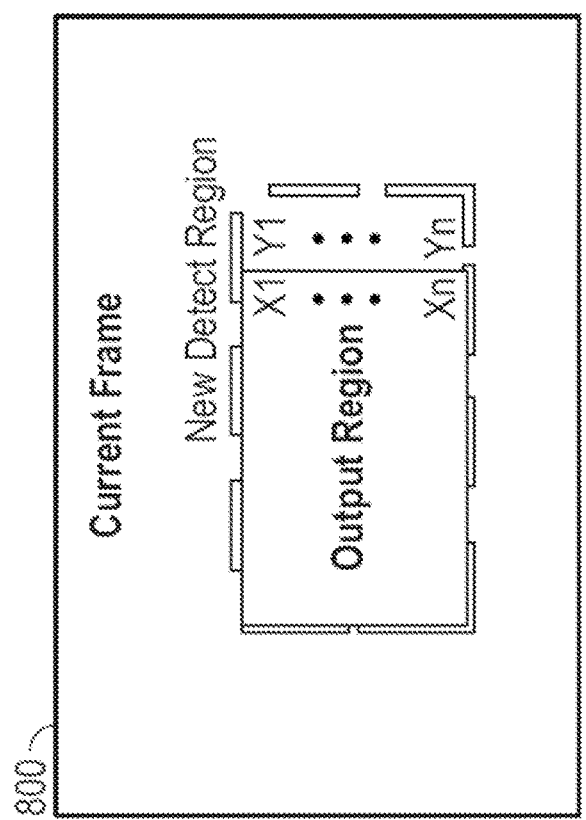

FIG. 8 is a diagram illustrating a current video frame and a reference for detecting video region movement. To address possible image fragmentation due to video dragging, four cases may be detected using boundary pixels in sub-video region. Boundary pixels in a sub-video region are described as to a current frame 800 as (X1-Xn, Y1-Yn) and as to a reference frame 802 AS (P1-Pn, Q1-Qn). X1-Xn and P1-Pn are pixels inside video region. Y1-Yn and Q1-Qn are pixels outside video region.

If the boundary pixels change frequently, the client device may determine that a sub-video region is being moved, such as such as a user dragging a video object or the video object automatically moving across the screens. In this instance, the previous output region would not be reliable and should be cleared. If boundary pixels change slightly or infrequently, the client device may determine the occurrence of sub-video region jitter. It this instance, the client device may extend the sub-video region and shrink the sub-video region back after the region is determined to be stable again (i.e., no further sub-video region jitter occurring).

The client device may determine that whether boundary pixels inside a sub-video region change slightly and outside pixels change a lot of a background area of the sub-video (such as by a user scrolling via an input device operation) and the sub-video region is remains the same in size. In this instance, the client device may determine that the previous sub-video region is reliable and should be kept.

Referring back to FIG. 5, in step 504, a first client device may generate multiple video streams based on the determined one or more active pixel areas and the remaining pixel area of a video region. In some embodiments, the video context and text of the multiple video streams may be encoded adaptively. For example, a sub-video stream 216, 218 may be encoded with the same parameter of a video sharing mode, low resolution and high frame rate. In another example, the main video stream 220 may be encoded with the same parameter as normal sharing mode, a high resolution and a frame rate less than the frame rate of the sub-videos stream(s) 216, 218. In another example, the main video stream 220 may be encoded with a main encoder, sub-video stream 216, 218 is encoded with a sub-video encoder. In another example, the first client device may use a sub-video encoder comprising a hardware encoder and/or a software encoder. In another example, a main encoder and sub-video encoder utilized in parallel to accelerate encoding speed of the multiple video streams 216, 218, 220. In yet another example, the main video stream 220 and sub-video stream(s) 216, 218 are simultaneously sent to a receiving client device, and the receiving client device will separately decode the main video stream 220 and the sub-video streams (s) 216, 218.

In some embodiments, the first client device may perform bit allocation between the main video stream 220 and sub-video stream(s) 216, 218. For a limited network bandwidth, the first client device may transmit the encoding bit-stream to the receiving client device. In this instance, a target encoding bitrate may be used for respective encoding parameters for the main video stream 220 and for the sub-video stream(s) 216, 218. For sub-video steams(s) 216, 218, the encoded bitrate would be relatively constant. But for the main video stream 220, because there may be violent or intense bitrate changes for static and fast motion contents (such as sudden emerging web page, fast scrolling bar etc.), the main video stream 220 may have a large bitrate gap between encoded bitrate and target bitrate. In this instance, the following adaptive bit allocation be used. If bandwidth is larger than the total target bitrate, allocate the bandwidth with a linear model; and if bandwidth is smaller than the total target bitrate, the bandwidth of sub-video stream may be tuned according to gap between the bandwidth and the encoded bitrate for main video stream 220 and sub-video stream(s) 216, 218.

As noted previously, the main video stream 220 and sub-video stream(s) 216, 218 may be transmitted by the first client device separately to one or more other client devices. However, sometimes the main video stream 220 and the sub-video stream(s) 216, 218 may not be received and decoded simultaneously by the receiving client device. In such an instance, the video streams received by a client device may need to be synchronizes so as to avoid being combined or composited incorrectly. A stream seq index syntax may used to sync the main video stream 220 and the sub-video stream(s) 216, 218, where the main video stream and the sub-video streams have the same identifier (ID) that can be mixed and displayed. For example, a stream seq index value may start at 0, and be transmitted in an RTP extension for the RTP package. If total number of main video stream and sub-video stream changes, the stream seq index value will increase. This process would include a decoder check and further processing. The client device may perform a decoder check the integrity of the received main stream 220 and sub-video stream(s) 216, 218.

The integrity means that the main video stream 220 and the sub-video streams(s) 216, 218 have the same stream seq index and the decoded stream number is equal to streamnum (i.e., the total number of the stream). If the integrity is true, the receiving device may mix the video streams 220, 216, 218 into one composite video for displaying via a user interface of the receiving client device. Since the main decoder and sub-video decoder decode and mix the bitstream sequentially, and sub-video stream has higher frame rate, the receiving client device may mix an output video for display depending on sub-video stream 216, 218. If one picture of sub-video stream 216, 218 refreshes or the refresh time interval is larger than a fixed interval (such as 50 ms), the receiving device may display the mixed picture of the main video stream 220 and the sub-video stream(s) 216, 218.

Figure 9:
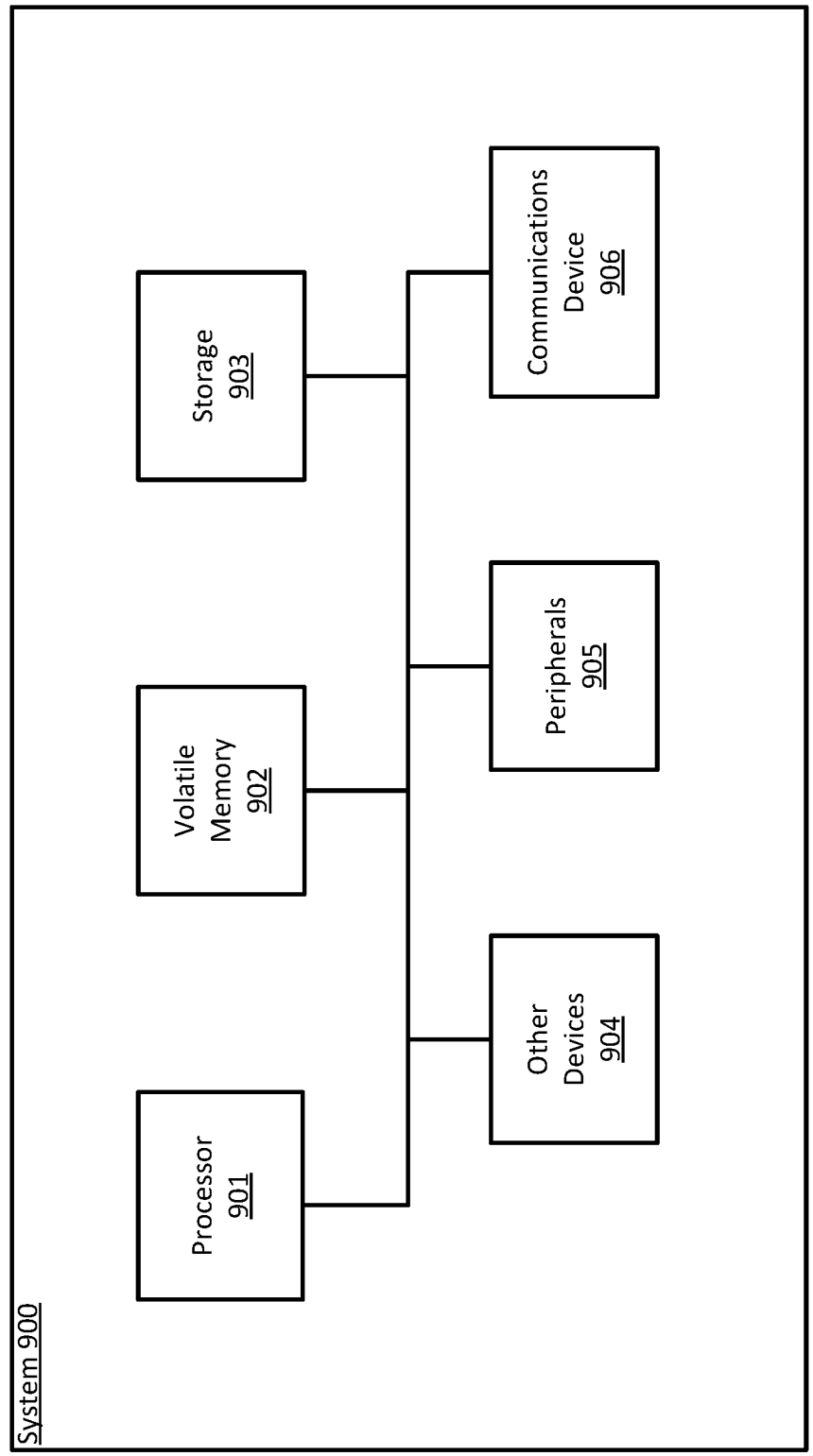
FIG. 9 is a diagram illustrating an exemplary computer that may perform processing in some embodiments.

FIG. 9 is a diagram illustrating an exemplary computer that may perform processing in some embodiments. Exemplary computer 900 may perform operations consistent with some embodiments. The architecture of computer 900 is exemplary. Computers can be implemented in a variety of other ways. A wide variety of computers can be used in accordance with the embodiments herein.

Processor 901 may perform computing functions such as running computer programs. The volatile memory 902 may provide temporary storage of data for the processor 901. RAM is one kind of volatile memory. Volatile memory typically requires power to maintain its stored information. Storage 903 provides computer storage for data, instructions, and/or arbitrary information. Non-volatile memory, which can preserve data even when not powered and including disks and flash memory, is an example of storage. Storage 903 may be organized as a file system, database, or in other ways. Data, instructions, and information may be loaded from storage 903 into volatile memory 902 for processing by the processor 901.

The computer 900 may include peripherals 905. Peripherals 905 may include input peripherals such as a keyboard, mouse, trackball, video camera, microphone, and other input devices. Peripherals 905 may also include output devices such as a display. Peripherals 905 may include removable media devices such as CD-R and DVD-R recorders/players. Communications device 906 may connect the computer 900 to an external medium. For example, communications device 906 may take the form of a network adapter that provides communications to a network. A computer 900 may also include a variety of other devices 904. The various components of the computer 900 may be connected by a connection medium such as a bus, crossbar, or network.

It will be appreciated that the present disclosure may include any one and up to all of the following examples.

Example 1: A computer-implemented method comprising: determining an active pixel area of a video region; determining a remaining pixel area of the video region; generating a first video stream of the active pixel area, the first video stream having a first frame rate; generating a second video stream of the remaining pixel area, the second video stream having a second frame rate that is a frame rate lower than the first frame rate; and transmitting, by a first client device, the first video stream and the second video stream to a second client device.

Example 2: The computer-implemented method of Example 1, wherein the active pixel area of the video region includes an area of changing pixel values among consecutive frames of the video region.

Example 3: The computer-implemented method of any one of Examples 1-2, wherein the remaining pixel area of the video region includes a portion of the video region that has a group of static pixel values among consecutive frames of the video region.

Example 4: The computer-implemented method of any one of Examples 1-3, further comprising: determining whether pixels about a boundary of the active pixel area are changing among frames of the video region; and increasing a size of the active pixel area to include those pixels that are determined to be changing.

Example 5: The computer-implemented method of any one of Examples 1-4, wherein the first video stream is transmitted at a variable bitrate, and the second video stream is transmitted at a constant bitrate.

Example 6: The computer-implemented method of any one of Examples 1-5, further comprising: determining a second active pixel area of the video region; generating a third video stream of the second active pixel area, the third video stream having a third frame rate; and transmitting, by the first client device, the third video stream to a second client device concurrently with the first video stream and the second video stream.

Example 7: The computer-implemented method of any one of Examples 1-6, comprising: receiving, by the first client device, a third video stream having a third frame rate, the third video stream generated by the second client device; receiving, by the first client device, a fourth video stream having a fourth frame rate, the fourth frame rate being a frame rate greater than the third frame rate; combining, by the first client device, the third video stream and the fourth video stream to form a composite video stream; and providing for display the composite video stream to a user interface of the first client device, wherein the composite video stream displays at the frame rate of the third video stream.

Example 8: A non-transitory computer readable medium that stores executable program instructions that when executed by one or more computing devices configure the one or more computing devices to perform operations comprising: determining an active pixel area of a video region; determining a remaining pixel area of the video region; generating a first video stream of the active pixel area, the first video stream having a first frame rate; generating a second video stream of the remaining pixel area, the second video stream having a second frame rate that is a frame rate lower than the first frame rate; and transmitting, by a first client device, the first video stream and the second video stream to a second client device.

Example 9: The non-transitory computer readable medium of Example 8, wherein the active pixel area of the video region includes an area of changing pixel values among consecutive frames of the video region.

Example 10: The non-transitory computer readable medium of any one of Examples 8-9 The non-transitory computer readable medium of claim 8, wherein the remaining pixel area of the video region includes a portion of the video region that has a group of static pixel values among consecutive frames of the video region.

Example 11: The non-transitory computer readable medium of any one of Examples 8-10, the operations further comprising: determining whether pixels about a boundary of the active pixel area are changing among frames of the video region; and increasing a size of the active pixel area to include those pixels that are determined to be changing.

Example 12: The non-transitory computer readable medium of any one of Examples 8-11, wherein the first video stream is transmitted at a variable bitrate, and the second video stream is transmitted at a constant bitrate.

Example 13: The non-transitory computer readable medium of any one of Examples 8-12, the operations further comprising: determining a second active pixel area of the video region; generating a third video stream of the second active pixel area, the third video stream having a third frame rate; and transmitting, by the first client device, the third video stream to a second client device concurrently with the first video stream and the second video stream.

Example 14: The non-transitory computer readable medium of any one of Examples 8-13, the operations further comprising: receiving, by the first client device, a third video stream having a third frame rate, the third video stream generated by the second client device; receiving, by the first client device, a fourth video stream having a fourth frame rate, the fourth frame rate being a frame rate greater than the third frame rate; combining, by the first client device, the third video stream and the fourth video stream to form a composite video stream; and providing for display the composite video stream to a user interface of the first client device, wherein the composite video stream displays at the frame rate of the third video stream.

Example 15: A system comprising one or more processors configured to perform the operations of: determining an active pixel area of a video region; determining a remaining pixel area of the video region; generating a first video stream of the active pixel area, the first video stream having a first frame rate; generating a second video stream of the remaining pixel area, the second video stream having a second frame rate that is a frame rate lower than the first frame rate; and transmitting, by a first client device, the first video stream and the second video stream to a second client device.

Example 16: The system of Example 15, wherein the active pixel area of the video region includes an area of changing pixel values among consecutive frames of the video region.

Example 17: The system of any one of Examples 15-16, wherein the remaining pixel area of the video region includes a portion of the video region that has a group of static pixel values among consecutive frames of the video region.

Example 18: The system of any one of Examples 15-17, the operations further comprising: determining whether pixels about a boundary of the active pixel area are changing among frames of the video region; and increasing a size of the active pixel area to include those pixels that are determined to be changing.

Example 19: The system of any one of Examples 15-18, wherein the first video stream is transmitted at a variable bitrate, and the second video stream is transmitted at a constant bitrate.

Example 20: The system of any one of Examples 15-19, the operations further comprising: determining a second active pixel area of the video region; generating a third video stream of the second active pixel area, the third video stream having a third frame rate; and transmitting, by the first client device, the third video stream to a second client device concurrently with the first video stream and the second video stream.

Example 21: The system of any one of Examples 15-19, the operations further comprising: receiving, by the first client device, a third video stream having a third frame rate, the third video stream generated by the second client device; receiving, by the first client device, a fourth video stream having a fourth frame rate, the fourth frame rate being a frame rate greater than the third frame rate; combining, by the first client device, the third video stream and the fourth video stream to form a composite video stream; and providing for display the composite video stream to a user interface of the first client device, wherein the composite video stream displays at the frame rate of the third video stream.

Some portions of the preceding detailed descriptions have been presented in terms of algorithms, equations and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
generating a first video stream representative of a first set of pixels of an initial video stream of a first client device connected to a video conference;
generating a second video stream representative of a second set of pixels of the initial video stream; and
transmitting the first video stream and the second video stream for rendering at one or more second client devices connected to the video conference.

2. The method of claim 1, comprising:
determining a remaining area including a third set of pixels of the initial video stream;
generating a third video stream representative of the third set of pixels; and
transmitting the third video stream for rendering at the one or more second client devices.

3. The method of claim 1, comprising:
increasing, based on a change to one or more pixels near the first set of pixels, a size of the first set of pixels to include the one or more pixels in the first set of pixels.

4. The method of claim 1, comprising:
decreasing, based on a change to one or more pixels near the first set of pixels, a size of the first set of pixels to exclude the one or more pixels from the first set of pixels.

5. The method of claim 1, comprising:
identifying the first set of pixels based on an active pixel area within the initial video stream.

6. The method of claim 1, wherein transmitting the first video stream and the second video stream for rendering at the one or more second client devices comprises:
transmitting the first video stream at a variable bitrate; and
transmitting the second video stream at a constant bitrate.

7. The method of claim 1, wherein one or both of the first set of pixels or the second set of pixels correspond to a change in visual content depicted among consecutive frames of the initial video stream.

8. The method of claim 1, wherein the first video stream and the second video stream have different frame rates.

9. A non-transitory computer readable medium storing instructions operable to cause one or more processors to perform operations comprising:
generating a first video stream representative of a first set of pixels of an initial video stream of a first client device connected to a video conference;
generating a second video stream representative of a second set of pixels of the initial video stream; and
transmitting the first video stream and the second video stream for rendering at one or more second client devices connected to the video conference.

10. The non-transitory computer readable medium of claim 9, the operations comprising:
generating a third video stream corresponding to a remaining area of the initial video stream; and
transmitting the third video stream for rendering at the one or more second client devices.

11. The non-transitory computer readable medium of claim 9, the operations comprising:
changing a size of the first set of pixels based on a change to one or more pixels nearby the first set of pixels.

12. The non-transitory computer readable medium of claim 9, wherein the first set of pixels is identified based on a correspondence between the first set of pixels and an active pixel area within the initial video stream.

13. The non-transitory computer readable medium of claim 9, wherein one of the first video stream or the second video stream is transmitted at a variable bitrate and the other is transmitted at a constant bitrate.

14. A system, comprising:
one or more memories; and
one or more processors configured to execute instructions stored in the one or more memories to:
generate a first video stream representative of a first set of pixels of an initial video stream of a first client device connected to a video conference;
generate a second video stream representative of a second set of pixels of the initial video stream; and
transmit the first video stream and the second video stream for rendering at one or more second client devices connected to the video conference.

15. The system of claim 14, wherein the one or more processors are configured to execute the instructions to:
identify the first set of pixels based on an area of changing pixel values among consecutive frames of the initial video stream.

16. The system of claim 14, wherein the one or more processors are configured to execute the instructions to:
transmit, for rendering at the one or more second client devices, a third video stream generated based on a remaining area of the initial video stream.

17. The system of claim 14, wherein a size of the first set of pixels is increased to include one or more pixels nearby the first set of pixels based on a change to the one or more pixels.

18. The system of claim 14, wherein a size of the first set of pixels is decreased to exclude one or more pixels nearby the first set of pixels based on a change to the one or more pixels.

19. The system of claim 14, wherein the first video stream and the second video stream are transmitted at different bitrates.

20. The system of claim 14, wherein the first set of pixels corresponds to a change in visual content depicted among consecutive frames of the initial video stream and the second set of pixels corresponds to static visual content depicted within the consecutive frames.

* * * * *